Sept. 12, 1950        W. C. GREGORY        2,521,845
METHOD OF MAKING COMPOSITE GLASS AND METAL ARTICLES
Filed July 26, 1944
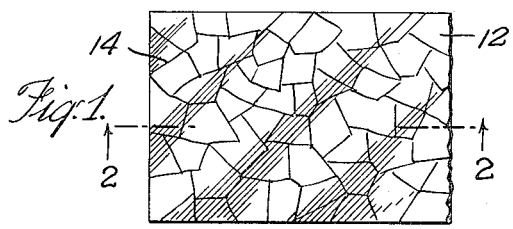
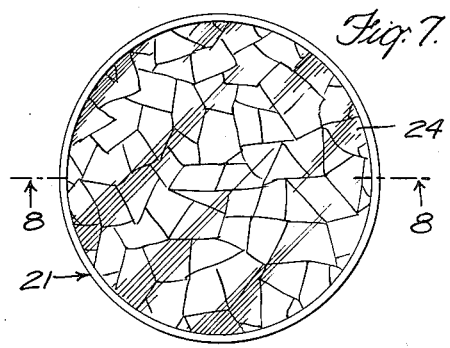
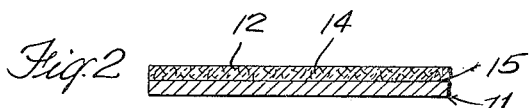
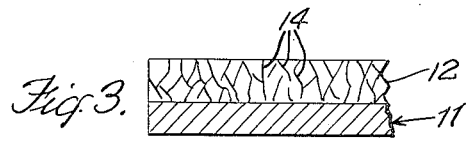
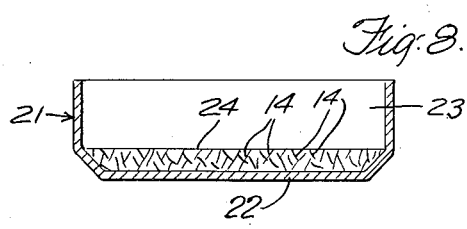
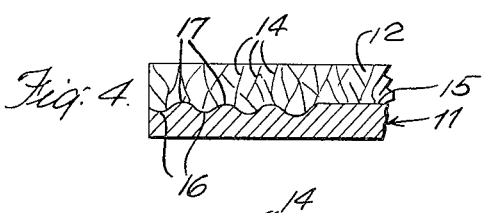
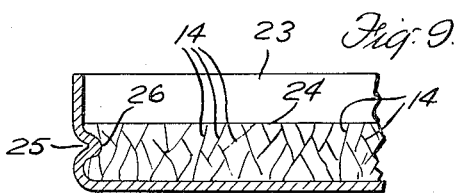
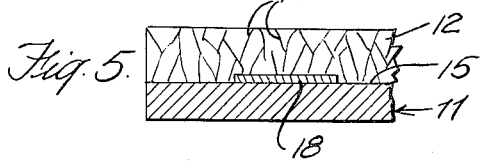
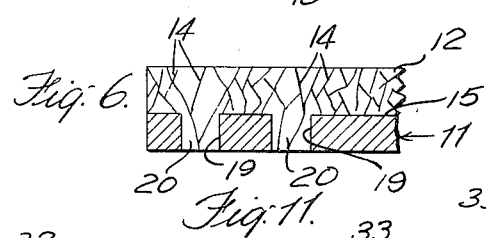
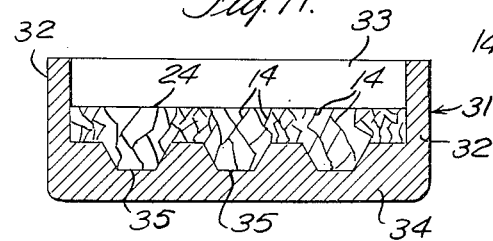
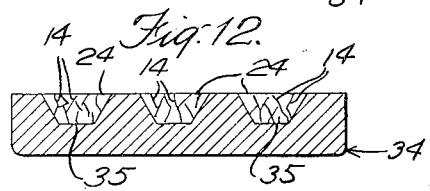
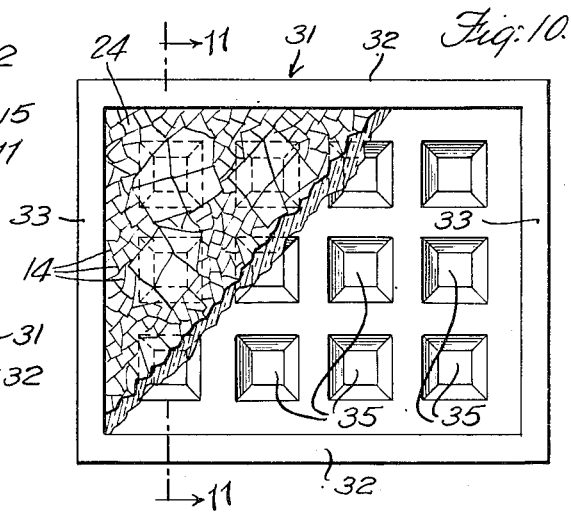
INVENTOR
WAYLANDE C. GREGORY.
BY
ATTORNEY Patented Sept. 12, 1950

2,521,845

UNITED STATES PATENT OFFICE 2,521,845

METHOD OF MAKING COMPOSITE GLASS AND METAL ARTICLES

Waylande C. Gregory, Bound Brook, N. J.

Application July 26, 1944, Serial No. 546,609

9 Claims. (Cl. 49—79)

This invention relates to methods of making composite articles, and in particular to such articles embodying areas or portions of glass, of suitable color or colors, provided with internal fractures forming light-reflecting facets or surfaces imparting to the aforesaid areas or portions live gem-like or jewel-like properties of great decorative, artistic and aesthetic value.

It is the object of this invention to provide new and improved methods of making articles of the class described above wherein the internally fractured areas or portions are secured to bases or frames of metal providing added strength and protection therefor and/or facilitating fabrication of other objects or articles made up of a plurality of such composite articles as units.

It is a further object of this invention to provide methods of making such articles which possess strength and ruggedness sufficient to fit them for numerous and widely varied uses functionally, in addition to their decorative utility.

This application is a continuation-in-part of my copending application Serial No. 426,584, filed January 13, 1942, which matured into U. S. Letters Patent No. 2,357,399, granted September 5, 1944.

These and other objects and advantages of the invention will clearly appear from the following description taken with the accompanying drawing and the appended claims.

In the drawing:

Fig. 1 is a plan view of a composite article comprising a composite glass and metal panel, illustrative of one application of this invention;

Fig. 2 is a section taken substantially on the line 2—2 in Fig. 1;

Fig. 3 is an enlarged fragmentary view, in section, of the structure shown in Figs. 1 and 2, with cross-hatching omitted from the glass layer or portion in the interest of clearness;

Fig. 4 is a view, similar to Fig. 3, of a modification of the structure shown in Figs. 1, 2 and 3;

Fig. 5 is a view, similar to Figs. 3 and 4, of a second modification embodying an inset or embedded design element;

Fig. 6 is a view of another modification embodying lens forming areas of glass of thickness coextensive with the thickness of the composite article;

Fig. 7 is a plan view illustrating application of the principles of this invention as a walled vessel or article, such as a tray;

Fig. 8 is a section taken substantially on the line 8—8 of Fig. 7;

Fig. 9 is a fragmentary view in section illustrating the provision of mechanical interlock between the glass and metal for additional security of attachment;

Fig. 10 is a plan view, partly in section, illustrating application of the principles of this invention to a decorative panel for use, for instance, for constructional purposes;

Fig. 11 is a section taken substantially on the line 11—11 of Fig. 10; and

Fig. 12 is a view, similar to Fig. 11, of another modification having alternate metal and internally fractured glass surface areas.

In my aforesaid application Serial No. 426,584, filed January 13, 1942, which matured in U. S. Letters Patent No. 2,357,399, granted September 5, 1944, disclosure is made of composite articles constructed of glass and ceramic material wherein the glass is provided with internal fractures forming light reflecting facets haphazardly arranged and extending generally depthwise and imparting great beauty and aesthetic appeal to the articles by reason of the simulation, by the glass, of sheets of gems or jewels. Methods of manufacturing such articles are also described and claimed therein.

This invention herein disclosed extends the principles of the invention described and claimed in the aforesaid application to other articles and uses, and provides methods for accomplishing the aforesaid extension as hereinafter set forth in detail.

As shown in Figs. 1–3, an article embodying the principles of this invention may comprise a metal support or backing sheet or panel 11 having bonded or fused thereto a substantially coextensive layer 12 of internally fractured vitreous material or glass of substantial depth, i. e., substantially thicker than a glaze, enamel or other coating. The fractures 14 (Fig. 3) are haphazardly arranged and form light reflecting facets within the glass layer 12 which impart to the visible surface of the article the appearance of an expanse of gems or jewels of great richness and aesthetic appeal. The glass may be of any color, either uniform throughout or varied throughout, as desired. Such an article is suitable for use as a tile or panel where the artistic or decorative gem-like qualities thereof are desirable but where the convenience of metal fabrication is also desired.

While the interface or bonding surface 15 of the article illustrated in Figs. 1–3 is planar, it may be varied by provision of alternate grooves 16 and lands 17 (Fig. 4) or the like, for varying the depth of the sheet or layer of internally fractured glass locally and for controlling the size and disposition of the "crystals" formed by the fractures which extend generally depthwise of the glass layer and which tend to arrange themselves perpendicular to the interface (see Fig. 11).

Likewise, suitable ornamental or decorative elements or devices 18 may be interposed substantially at the bonding line or plane 15, between the metal base or base member 11 and the internally fractured sheet or layer 12 as shown in Fig. 5, or, as will be readily understood, the ornaments or devices 18 may lie completely within the body of the sheet or layer 12, out of contact with the base or base member 11. Since these ornaments or decorative devices are visible only through the sheet or layer 12 with its light reflecting facets or surfaces 14 and its color or colors, many extremely interesting, varied aesthetic effects may be secured by their use as described above.

A further variation in the effect secured by this composite metal and internally fractured glass construction may be achieved by interrupting the continuity of the base or base member 11 at desired intervals or locations by the provision of apertures such as 19 (Fig. 6) whereby portions of the layer 12 are made to extend, at suitable locations, from side to side of the composite article. The lenses 20 formed by the glass within the apertures 19 form light transmitting extensions of the sheet or layer proper 12 making possible the transmission of light into, and through, the layer or sheet 12. Any desired symbols, ornaments or devices may be outlined by these lenses 20 by suitable location of the apertures 19 and formation of the light transmitting lenses 20 therein, as hereinafter described.

While the above description relates to substantially flat, sheetlike articles, it is of course to be understood that the principles of this invention are adapted also to trays, bowls, cups and the like such as the illustrative vessel shown in Figs. 7 and 8. That vessel comprises a cup or tray 21 of metal, with a base or bottom wall 22 and continuous flange or side wall 23. Within the recess formed by the bottom wall 22 and side wall 23, a layer or sheet 24 of internally fractured glass of substantial thickness or depth (corresponding to the above described sheet or layer 12) is fused or bonded to the bottom portion of the interior of the vessel 21.

In order to enhance the security of attachment of the sheet or layer 24 to the vessel 21, the side wall or flange 23 may be grooved (Fig. 9) to form an inwardly directed annular flange 25 engaging a complementary groove 26 formed in the sheet or layer 24 during fusing or bonding. Likewise, when this construction is used the layer or sheet 24 may be formed (with or without its internal fractures) independently from the vessel or body 21, with the peripheral groove or channel 26 formed therein, then inserted in the interior of the vessel 21 before the flange 25 is formed therein, and the flange 25 thereafter formed in the side wall 23, for instance, by spinning. The latter step conforms the inwardly directed flange 25 so closely with the groove 26 in the sheet or layer 24 as firmly and securely to connect the glass sheet or layer 24 and the metal vessel 21 together. If the layer or sheet 24 was not internally fractured when secured to the vessel 21, localized thermal shock may then be applied, as hereinafter described, to form the fractures therein.

While the object or vessel 21 (Figs. 7-9) is of relatively light construction capable of production by stamping, drawing, and/or spinning, the principles of the invention are readily adaptable to generally similar metal bodies of substantially greater wall thickness and weight such as the body of the rectangular tray 31 shown in Figs. 10 and 11. The side walls 32 and end walls 33 are of substantial thickness as is also the bottom wall 34, and the latter wall 34 is provided with deep spaced recesses 35 of any suitable size, shape and spacing forming spaced areas of greater depth than the depth of the sheet or layer 24 as a whole and the depth of these areas being varied because of the inclination of the sides of the recesses 35. In other words, the internally fractured glass in the recesses 35 forms a series of geometric extensions of the sheet proper 24.

Since the fractures or facets 14 extending from the back or unexposed surfaces of the glass arrange themselves substantially normal to the underlying metal surfaces, generally speaking, the angles of the light reflecting surfaces or facets formed thereby may be rather closely controlled by the use of such recesses, etc., to vary the size of the "crystals" formed by the fractures 14 which size varies, generally, with the depth of the glass as well as with the angles of the facets thereof as described above.

As shown in Fig. 12, the walls 32 and 33 may be omitted from the tray 31 and a structure formed which is particularly adapted to use as a tread member, block, or tile and which comprises a metal body 34 provided with spaced recesses 35 containing decorative bodies 24 of internally fractured glass with gem-like light reflecting properties. In this article, a part of the tread surface is glass but the surrounding surfaces are metal.

It will, of course, be understood that the composite bodies described above may be provided with any suitable protective coatings such as glazes, lacquers, clear varnishes when desired.

It is, likewise, to be understood that the use of suitable glass-metal bonding aids such as ground coats or fluxes applied to the bonding surfaces or interfaces is comprehended where the nature of the materials makes such use desirable or necessary.

While the above description relates, generally, to the structure of the composite articles to which this invention relates, methods of production are set forth in detail hereinafter.

In making the above described composite articles, and similar articles, an area or layer of glass is firmly secured to a metal base, plate or backing member. After the attachment of the glass body or layer to the metal, the above described internal fractures or cracks are formed in the glass without destruction of, or impairment of, the glass-metal bond.

In order to secure firm attachment or bonding of the glass to the metal, the metal sheet and the glass or glass-forming material are united at or near the fusing temperature of glass whereby the bonding occurs by reason of fusing of the glass to the metal.

In the following claims the terms "glass" and "vitreous material" are to be broadly interpreted as including prefired or fritted glass, raw glass or glass-forming materials convertible to molten glass by the heat of fusion or bonding, or mixtures of such fritted glass, raw glass or glass-forming materials in any suitable proportions, convertible by the heat of fusion to fusible molten glass. This glass will bond to (i. e., fuse with) the metal base or base member and thus become so firmly secured thereto, or integrated therewith that internal cracking or fracture of the glass may occur subsequently by reason of localized application of thermal shock, or by reason of differential shrinkage upon cooling, without destruction of the bond between the glass and the metal material of the base or base member.

The metal base and the "glass" i. e., fritted glass, raw glass or glass-forming materials, or a mixture thereof, may be placed together in a conventional kiln and heated together to a temperature at or above the fusing temperature of glass whereby molten glass will be formed and bonded to (i. e., fused to) the metal. The fusing temperature will of course be maintained for sufficient time to effect complete fusion.

Alternatively molten glass may be prepared independently of the heating of the metal and the metal base, backing plate or vessel, the base or vessel heated to the desired temperature, and the molten glass then placed thereon or therein.

Where the article is of sheet like form i. e., unprovided with side walls or upstanding flanges (Figs. 1–6) independent means, not shown, such as removable walls or frames of refractory material, metal or wood may be provided for maintaining the glass, when molten, upon the metal sheet, plate or backing at desired depth.

Where such means comprises metal it may be provided with suitable known cooling means for maintaining its temperature below glass-metal bonding temperature. If the aforesaid means comprises refractory or ceramic material it may be broken away and the surfaces of the glass layer ground or otherwise finished after the glass-metal bonding has occurred.

If the use of ground coatings or fluxes are desirable or necessary, they will be applied to the interfaces or bonding surfaces of the metal either before the metal is heated or after the metal is heated and before the glass is applied, depending upon the nature of the ground coating or flux.

Generally, the metal chosen as a base for such articles is such that its coefficient of expansion differs sufficiently from that of the glass to cause the differential glass-metal shrinkage to overcome the cohesion in the glass, upon cooling, and induce fracture strains in the glass without however breaking or impairing the glass-metal bond. In such cases cooling of the composite article from glass-metal fusing or bonding temperature will be followed by the production in the glass of the above described light reflecting facet forming cracks or fractures.

In other cases, the composite article may be heated to suitable temperature (two hundred or more degrees Farenheit above normal room temperature, for instance) and localized fracture producing strains induced therein by the localized application of suitable cooling media such as cool fluids or contact with a "blanket" or other agent carrying such media.

Where it is desired to produce an article embodying one or more design elements at or adjacent the interface such as 18 (Fig. 5) this element may be applied to the base 11 before it is heated or inserted in the glass thereon while the glass is molten.

While many metals may be used in forming the metal base member, backing or sheet to which the glass layer is attached, I prefer to use those having fusion temperatures above 1200 degrees F., more preferably above 1500 degrees F., in view of the comparative fusing points of various glasses and metals as set forth in the following tables of approximate fusion points or temperatures.

| Metal: | Fusion point, degrees F. |
|---|---|
| Aluminum | 1217.7 |
| Silver | 1760.9 |
| Brass | 1870.0 |
| Gold | 1945.5 |
| Copper | 1981.4 |
| Cast iron (white) | 2075.0 |
| Cast iron (grey) | 2230.0 |
| Steel | 2372.0 |
| Wrought iron | 2732.0 |
| Nickel | 2646.0 |
| Platinum | 3191.0 |

While glasses of widely varying compositions may be used in the practice of this invention, glasses which have been found quite satisfactory are those glasses of the low melting type, generally called "common glass" such as: "lead borate" glass with a melting point of 855° F. (approx.); "sodium-potash-silicate" glass with a melting point of 950° F. (approx.); "lead-potash-silica" glass with a melting point of 1200° F. (approx.); or, "medium" or normal melting glasses such as: "calcium-sodium-silicate" glasses with melting points slightly above 1200° F.

Of course, in combining any of the above glasses with any of the above metals, a rather wide latitude is permissible so long as the haphazardly arranged internal light reflecting facets may be formed in the glass and adequate glass-metal bond be secured in the finished product.

From the above description it will clearly appear that I have provided new and improved methods of making composite articles of glass and metal embodying great decorative value and having widely varying applications, which are susceptible of production with ease and economy from relatively cheap materials as herein described and hereinafter claimed.

It is of course to be understood that the above description is merely illustrative and in nowise limiting and that I desire to comprehend within this invention such modifications as are included within the scope of the appended claims.

Having thus described my invention what I claim as new and desire to secure by Letters Patent is:

1. The method of making a composite glass and metal article which comprises, forming a metal base with a recess therein, casting in said recess a body of glass substantially thicker than a glaze and inducing in said glass body internal stresses causing internal fractures therein forming light reflecting facets imparting a jewel-like quality to said glass body.

2. The method of making a composite glass and metal article which comprises, forming a metal base with a recess therein, casting in said recess a body of glass substantially thicker than a glaze while fusing said glass body to said base, and applying thermal shock to said glass body for inducing in said glass body internal strains causing internal fracture therein producing light reflecting facets haphazardly arranged therein and imparting a jewel-like quality to said glass body.

3. The method of making a composite glass and metal article which comprises, providing a metal base, placing on said base material convertible to molten glass at the fusion temperature of glass, heating said base and said material at least to the fusion temperature of glass to form molten glass and fuse it in the form of a glass layer to said base, and cooling said base and said glass layer to form in said glass layer light reflecting facet forming fractures imparting to said glass layer a gem-like quality.

4. The method of making a composite glass and metal article which comprises, providing a metal base member with a recess therein, placing in said recess materials convertible to molten glass at the fusion temperature of glass, heating said base and said glass forming material at least to the fusion temperature of glass to form molten glass and fuse it in the form of a glass layer in said recess, and so cooling said base and said glass layer as to form therein light reflecting facet forming fractures haphazardly arranged and imparting to said glass layer a crystalline gem-like quality.

5. The method of making a composite glass and metal article which comprises, providing a metal base member, treating a surface of said base member with a glass-metal fusion facilitating agent, placing on said surface glass forming materials convertible to molten glass above the fusion temperature of glass, heating said base and said glass forming material at least to the fusion temperature of glass to form molten glass and fuse it in the form of a glass layer to the aforesaid surface of said base, and so cooling said base and said glass layer as to form therein light reflecting facet forming fractures imparting to said glass layer a crystalline quality.

6. The method of forming a composite glass and metal article which comprises, providing a metal base member, heating said base member to a temperature approximating the fusing temperature of glass, applying molten glass to said base member at said temperature to form a glass layer thereon, and cooling said member to induce therein fracture forming strains for forming therein light reflecting facets imparting to said glass a jewel-like appearance.

7. The method of forming a composite glass and metal article which comprises, providing a metal base member, treating a surface of said base member with a glass-metal fusion promoting agent, heating said base member to a temperature approximating the fusing temperature of glass, applying molten glass to the treated surface of said base member at said temperature to form a glass layer thereon, and applying thermal shock to a portion at least of said glass layer to induce therein fracture forming strains for forming therein light reflecting facets imparting to said glass a jewel-like crystalline appearance.

8. The method of making a composite glass and metal article which comprises bonding to a metal base member a layer of glass substantially thicker than an enamel coating by the following steps: bonding molten glass to said metal base member, said metal base member and glass being near the fusion temperature of the glass, cooling the composite glass and metal base member and applying thermal shock until internal cracking of the glass occurs without destroying the bonding between the glass and the metal base member.

9. The method of making a composite glass and metal article which comprises bonding to a metal base member a layer of glass substantially thicker than an enamel coating by the following steps: bonding molten glass to said metal base member, including the application of bonding material between the glass and metal base member, said metal base member and glass being near the fusion temperature of the glass, cooling the composite glass and metal base member and applying thermal shock until internal cracking of the glass occurs without destroying the bonding between the glass and the metal base member.

WAYLANDE C. GREGORY.

REFERENCES CITED

The following references are of record in the file of this patent:

UNITED STATES PATENTS

| Number | Name | Date |
| --- | --- | --- |
| 273,371 | Lindsley | Mar. 6, 1883 |
| 1,556,364 | Smith | Oct. 6, 1925 |
| 1,594,940 | Goodridge | Aug. 3, 1926 |
| 1,603,552 | Middendorf | Oct. 19, 1926 |
| 1,646,468 | Warga | Oct. 25, 1927 |
| 1,654,401 | Bernheim | Dec. 27, 1927 |
| 1,960,121 | Moulton | May 22, 1934 |
| 2,071,294 | Branson | Feb. 16, 1937 |
| 2,073,254 | Redman | Mar. 9, 1937 |
| 2,357,399 | Gregory | Sept. 5, 1944 |

FOREIGN PATENTS

| Number | Country | Date |
| --- | --- | --- |
| 522 | Great Britain | 1899 |